United States Patent [19]

Bailey

[11] Patent Number: 4,950,525
[45] Date of Patent: Aug. 21, 1990

[54] ELASTOMERIC RETROREFLECTIVE SHEETING

[75] Inventor: Terry R. Bailey, Woodbury, Minn.

[73] Assignee: Minnesota Mining and Manufacturing Company, St. Paul, Minn.

[21] Appl. No.: 664,025

[22] Filed: Oct. 23, 1984

Related U.S. Application Data

[63] Continuation-in-part of Ser. No. 483,604, Apr. 11, 1983, Pat. No. 4,505,967.

[51] Int. Cl.⁵ .................. B32B 3/30; B32B 27/40; G02B 5/128
[52] U.S. Cl. .................. 428/164; 156/276; 428/161; 428/325; 428/344; 428/423.3; 428/425.8; 428/913; 350/105
[58] Field of Search .............. 428/161, 164, 325, 344, 428/423.3, 425.8, 913; 156/276; 380/105

[56] References Cited

U.S. PATENT DOCUMENTS

| | | | |
|---|---|---|---|
| 2,403,752 | 7/1946 | Phillippi | 428/161 |
| 2,407,680 | 9/1946 | Palmquist et al. | 88/82 |
| 3,154,872 | 11/1964 | Nordgren | 40/135 |
| 3,382,908 | 5/1968 | Palmquist et al. | 152/353 |
| 3,449,201 | 6/1969 | Palmquist et al. | 161/164 |
| 3,551,025 | 12/1970 | Bingham et al. | 350/105 |
| 3,785,719 | 1/1974 | Jonnes | 350/105 |
| 3,936,567 | 2/1976 | Vesely | 428/325 |
| 4,025,674 | 5/1977 | Mizuochi | 428/325 |
| 4,035,059 | 7/1977 | DeMaster | 350/105 |
| 4,367,920 | 1/1983 | Tung et al. | 350/105 |
| 4,418,110 | 11/1983 | May et al. | 428/143 |

Primary Examiner—George F. Lesmes
Assistant Examiner—Christopher Brown
Attorney, Agent, or Firm—Donald M. Sell; Walter N. Kirn; Roger R. Tamte

[57] ABSTRACT

Elastomeric embedded-lens retroreflective sheeting comprises a monolayer of non-stretchable microspheres; a sheet in which the microspheres are embedded which comprises a spacing layer of transparent elestomeric material underlying the back surface of the microspheres and a cover layer of transparent elastomeric material covering the front surface of the microspheres; and a specularly reflective layer disposed on the back surface of the spacing layer.

21 Claims, 4 Drawing Sheets

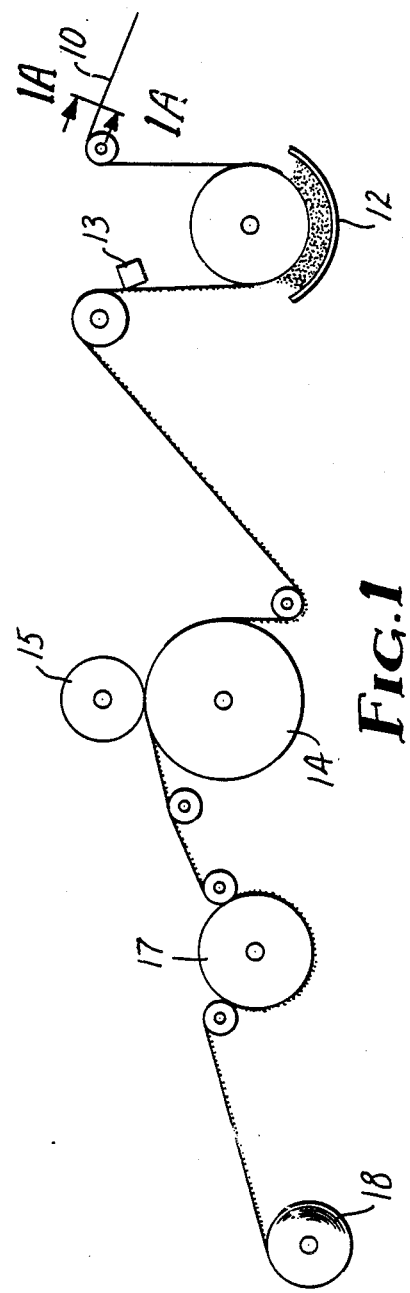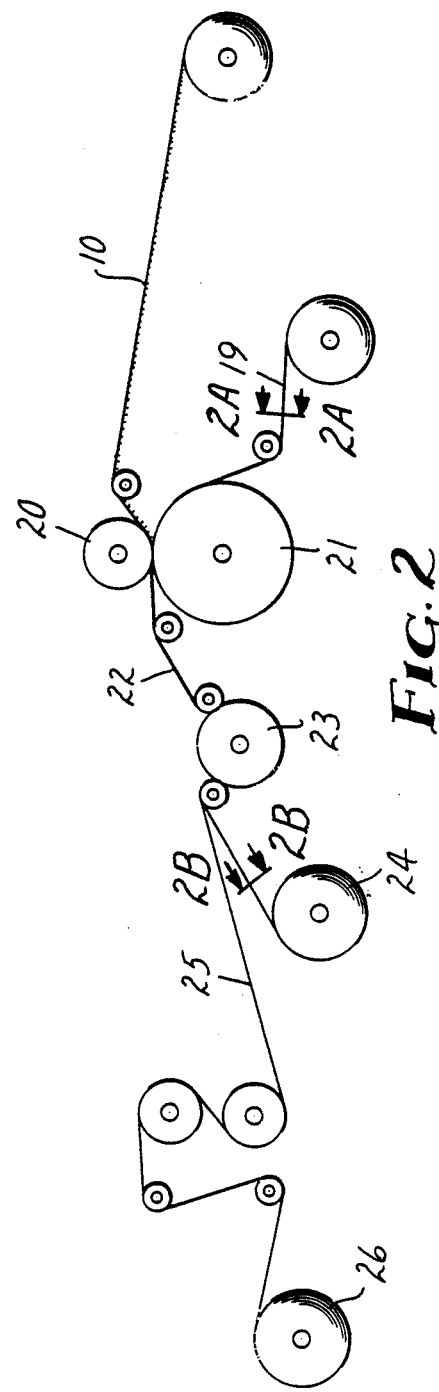

ELASTOMERIC RETROREFLECTIVE SHEETING

REFERENCES TO RELATED APPLICATION

This application is a continuation-in-part of pending application, Serial No. 483,604, filed Apr. 11, 1983, and now issued as U.S. Pat. No. 4,505,967.

BACKGROUND OF THE INVENTION

The effectiveness of embedded-lens retroreflective sheeting, as first described in U.S. Pat. No. 2,407,680, depends on the existence of rather precise optical relationships within the sheeting.

The sheeting comprises a monolayer of transparent microspheres, a transparent polymeric cover layer covering the front surfaces of the microspheres, a transparent polymeric spacing layer covering the back surfaces of the microspheres, and a specularly reflective layer coated on the back surface of the spacing layer. Retroreflection depends on there being an appropriate relationship of index of refraction between the transparent cover layer, spacing layer, and transparent microspheres, and on the spacing layer having an appropriate thickness such that light rays passed through the microspheres are focused onto the specularly reflective coating on the back surface of the spacing layer, where the light rays are reflected and returned back toward the original source of the light.

The need for precise optical relationships is perhaps a primary reason why, so far as known, there has never been an elastomeric version of embedded-lens retroreflective sheeting. The repeated stretching of the elastomeric spacing layer would be expected to disturb the needed optical relationship between the microspheres and specularly reflective coating on the back surface of the microspheres. For example, when a flat sheet of a transparent elastomeric material is coated with a specularly reflective coating and then repeatedly stretched and relaxed, reflection from the specularly reflective coating rapidly declines to a small fraction of its original brightness. Apparently the stretching rapidly cracks and disrupts the specularly reflective coating such that the layer loses its reflectivity.

There have been forms of elastomeric reflective sheeting before, for example, the sheet material taught in U.S. Pats. No. 3,382,908 and 3,449,201. But that sheeting was an exposed-lens form of sheeting in which a specularly reflective coating is placed directly on the back surface of the microspheres, and no polymeric material is interposed in the path of light incident on the sheeting and the specularly reflective coating. Accordingly the optical system, i.e., the lens structure and specularly reflective layer through which light passes, is never stretched.

U.S. Pat. No. 3,551,025 discloses a highly flexible embedded-lens retroreflective sheeting having an elastomeric transparent topcoat and binder layer, but the sheeting again avoids the use of a spacing layer between the microspheres and specularly reflective layer, meaning that there is no stretching of the specularly reflective layer, very high-index microspheres, e.g., above 2.4, and low-index polymers, e.g. 1.39, were used, and the specularly reflective layer was applied directly to the microspheres.

U.S. Pat. No. 4,418,110 teaches a non-elastomeric retroreflective sheeting which is intentionally stretched to rupture the specularly reflective laYer and make the sheeting permeable to vapor. The sheeting is stretched at elevated temperature and is stretched only once, and under those conditions it is found that retroreflection is retained.

SUMMARY OF THE INVENTION

The present invention provides a new embedded-lens retroreflective sheeting capable of being repeatedly stretched and relaxed while maintaining useful retroreflective properties. This new sheeting comprises
(a) a monolayer of transparent non-stretchable microspheres;
(b) a sheet in which the microspheres are embedded comprising
  (i) a transparent polymeric spacing layer underlying the back surface of the microspheres and having a back surface that is spaced from the back surface of the microspheres, and
  (ii) a transparent polymeric front layer covering the front surface of the microspheres; and
(c) a specularly reflective layer coating on the back surface of the spacing layer.

Both the transparent polymeric layers comprise elastomeric materials which may be repeatedly stretched, and upon release of the stretching tension rapidly return to substantially their original dimensions.

One possible explanation for the success of the present invention, in contrast to the drastic loss of reflection that occurs when a flat elastomeric sheet carrying a specularly reflective layer as described above is stretched and relaxed, is that in sheeting of the invention the specularly reflective layer is limited from deformation, at least in critical areas, by the anchoring effect of the transparent, non-stretchable microspheres and the portions of the sheeting around the microspheres. Under magnification, the specularly reflective surface on the flat elastomeric sheet is seen to be wrinkled between rupture lines or cracks in the specularly reflective layer, whereas such wrinkling is not seen in the specularly reflective layer in sheeting of the invention.

Some reduction in retroreflectivity of sheeting of the invention does occur during repeated stretching, but a high enough percentage is retained to provide useful retroreflection. For example, sheeting of the invention is particularly useful on deformable raised pavement markers, where the sheeting undergoes myriad numbers of hits by vehicles, and thereby undergoes myriad cycles of stretching and relaxation.

A further surprising advantage of the sheeting for use on pavement markings is that the sheeting remains clear and transparent on the roadway. Vehicle tires, and the flexing of the sheeting and marker when struck by vehicle tires, apparently remove road dirt. After tests on a roadway, sheeting of the invention continues to have a glossy clear front surface. The cover layer retains the microspheres in place (as opposed to being abraded or knocked out by road traffic when in exposed-lens versions) and the sheeting retains the noted high retroreflectivity.

Preferably, sheeting of the invention is prepared by a lamination process of the type described in parent application, Serial No. 483,604, now U.S. Pat. No. 4,505,967, the teachings of which are incorporated herein by reference. This process, as used in the invention, basically comprises the steps of preforming, preferably by extrusion, a first transparent elastomeric layer (the cover layer); embedding a monolayer of microspheres in the layer under heat and pressure, preferably to a depth less than one-half the average diameter of the microspheres; preforming, preferably by extrusion, a second transparent elastomeric layer (the spacing layer) and laminating the second layer to the microsphere-covered surface of the first layer so that the second layer follows the curved surfaces of the portions of the microspheres protruding from the first layer and contacts the first layer in the spaces between the microspheres; and coating the exposed configured surface of the second layer with a specularly reflective layer.

Typically in the described process, the microspheres are embedded into the first layer to depths that leave the extreme edges of the non-embedded portions of the microspheres in substantial alignment; and the microspheres are applied in lower numbers per unit area than might otherwise be obtained. These features contribute to better angularity for the sheeting. Also, the lower density of microspheres assists in maintaining good adhesion between the layers of the sheeting, since the spacing layer can be conformed more fully around the microspheres into contact with the cover layer. The lamination is preferably achieved by use of a cushioning web comprising a polymeric material which engages the second polymeric layer and which softens during the lamination step to a softer or lower viscosity condition than the second polymeric layer.

DETAILED DESCRIPTION

The invention will be further described by the following examples which refer to the attached drawings.

EXAMPLE 1

A thermoplastic aliphatic polyurethane resin having a melt index of 17.2 ("Q-thane" PN03-93E supplied by K. J. Quinn) was extruded through a thin slot onto a 2-mil-thick (50 micrometers thick) polyethylene terephthlate (PET) carrier film using standard film extrusion conditions (melt index was measured by the procedure of ASTM D1238 using a temperature of 175° C. and load of 5000 grams). The extruder, slot thickness and speed of the PET carrier film were adjusted to achieve a thickness for the extruded layer of 2 mils (50 micrometers).

Figure 1A:
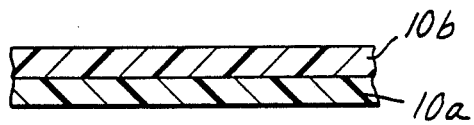
FIGS. 1, 2 and 5 are schematic diagrams of apparatus for preparing sheeting of the invention (FIGS. 1A, 2A and 2B are enlarged sectional views of sheeting being processed on the apparatus shown in FIGS. 1 and 2, respectively)

Microspheres were embedded into the extruded layer of described composite film using apparatus as shown in FIG. 1. The composite film is identified as 10 in FIG. 1, with the extruded layer of the composite film shown as 10a and the PET carrier film as 10b. The composite film 10 was pulled around a roller 11, which was heated to 240° F., with the PET layer 10b against the heated roller and the extruded layer 10a facing away from the roller. A pan 12 containing glass microspheres having an average diameter of 56 micrometers, a range in size of about 20 micrometers, and an index of refraction of 2.26 was positioned so that the microspheres formed a packed bed around the heated roller 11. As the composite film passed around the roller, the extruded layer 10a became slightly tacky and a monolayer of the microspheres became adhered to the layer. After leaving the roller, the composite film was vibrated slightly with a vibrator 13 to remove any excess microspheres, and then continued to a second roller 14, which was heated to 250° F.

The microsphere-coated side of the film traveled against the roller 14, and after traveling about 18 inches around the roller, the film engaged a silicone rubber nip roller 15, which was heated to 220° F. At the exit of the heated roll 14 and nip roll 15, the microspheres were found to have been pushed into the extruded layer 10a to about 20–40 percent of their diameter, and the non-embedded surfaces of the microspheres were substantially aligned in a common plane. The film 10, thus covered with microspheres, passed around a cooling roller 17 and then was wound up in a roll 18 before storage for further processing (alternatively the further processing can be performed in line with the apparatus shown in FIG. 1).

A cushioning web in the form of a commercially available web comprising a polyethylene-coated paper in which the polyethylene had a melt index of about 10 and the polyethylene coating was about 1 mil thick was then extrusion-coated with a layer adapted to serve as the spacing layer or film in the ultimate retroreflection sheeting. The layer was formed from a thermoplastic aliphatic polyurethane resin having a melt index of 2.6 ("Q-thane" P342-9L supplied by K.J. Quinn) and was extruded through a slot onto the dry surface of the coated polyethylene resin on the cushioning web. The extrusion conditions were adjusted to yield a 0.75-mil-thick (about 20 micrometers thick) extruded layer.

Figure 2A:
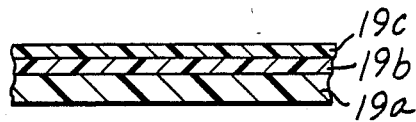
Figure 2B:
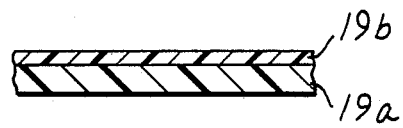

The cushioning web with extruded spacing layer was then laminated onto the previously prepared microsphere-covered film 10 using apparatus as shown in FIG. 2. The microsphere-covered film 10 and the spacing-layer-covered cushioning web 19 (comprising paper 19a, coated polyethylene 19b, and spacing layer 19c of 2,6-melt-index polyurethane were pressed together between a nip roller 20 and a heated roller 21). During feeding into the nip pressure area, the microsphere-covered film 10 was brought directly into the nip without any prior preheating, while the spacing-layer-covered cushioning web 19 was wrapped around the heated roller 21 prior to reaching the nip area. This arrangement kept the 17.2-melt-index polyurethane resin as cold as possible in relationship to the fully heated 2.6-melt-index resin, whereby the 17.2-melt-index resin is retained at a higher melt viscosity than the inherently higher viscosity 2.6-melt-index resin. Also the 2.6-index polyurethane resin and the polyethylene of the cushioning web attained the same temperature since they are held together and both preheated. At this temperature the 2.6-index polyurethane resin is more viscous than the polyethylene resin. The roller 21 was heated to 320° F.

The described differences in melt viscosity led to the following changes within the assembly during the application of pressure between the heated roll and nip roll: the microspheres tended to remain at their original level in the layer 10a of 17.2-index polyurethane; the spacing layer 19c of 2.6-index polyurethane was softened and forced around the portions of the microspheres protruding out of the layer 10a, and was conformed to follow the curved surfaces of the microspheres; and the polyethylene layer 19b deformed and flowed to allow the described conforming of the layer 19c.

After passage past the heated roll 20 and nip roll 21, the microsphere-covered film 10 and spacing-layer-covered cushioning web 19 were united as an assembly 22, which was then cooled by passage around a cooling roller 23. Thereupon the cushioning web (layers 19a and 19b) was stripped away and wound in a roll 24. The remaining product 25, comprising the polyester carrier film 10b and the laminated layers 10a and 19c, with microspheres embedded between the layers, was then wound in a storage roll 26 as shown; alternatively the film could have moved directly to stations which completed the retroreflective sheeting.

The product 25 was subsequently unwound from the storage roll and aluminum was vapor-deposited onto the conformed surface of the layer 19c to form a specularly reflective layer. The polyester carrier film 10b was then removed and an acrylate-based pressure-sensitive adhesive layer coated on a silicone-coated release liner was laminated to the vapor-coated surface to form a completed retroreflective sheeting like that shown in solid lines in FIG. 3. This complete product comprised the layer 10a of 17.2-melt-index polyurethane, serving as a top film; the glass microspheres 27; the conformed layer 19c of 2.6-melt-index polyurethane, serving as a spacing film or layer; the layer 28 of vapor-deposited aluminum; the layer 29 of pressure-sensitive adhesive; and the release liner 30.

The retroreflectivity of the completed sheeting was then measured with a retroluminometer as described in United States Defensive Publication T987,003. This instrument projects a one-inch-diameter circle of light onto a sample of the sheeting and measures the light returned at a selected divergence angle. At the small incident angle of 5° (instead of 0° to eliminate specular reflection from the face of the sheeting) and 0.2° divergence angle, the retroreflectivity of the completed sheeting was found to be 110 candelas per lumen. The retroluminometer was then swung away from the perpendicular with the same light beam continuing to be projected on the sample. The angle at which the sheeting had half the brightness (55 candelas per lumen) was found to be 47° when measured downweb and 55° when measured crossweb.

Figure 3:
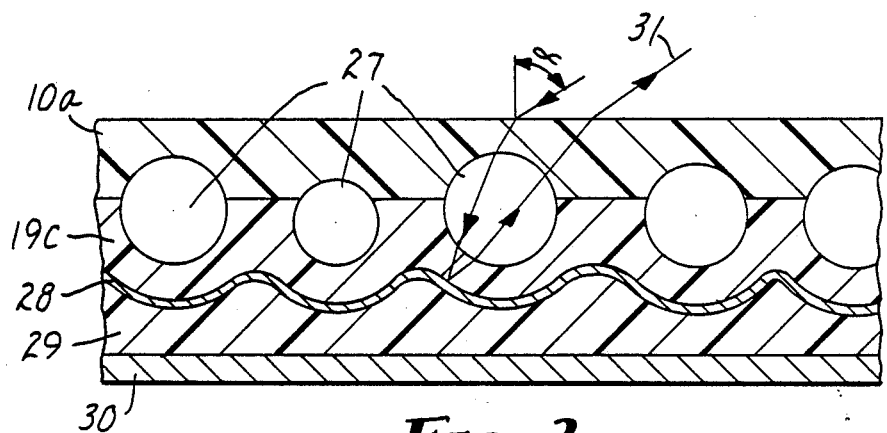
FIG. 3 is a sectional view of a representative sheeting of the invention.
Figure 4:
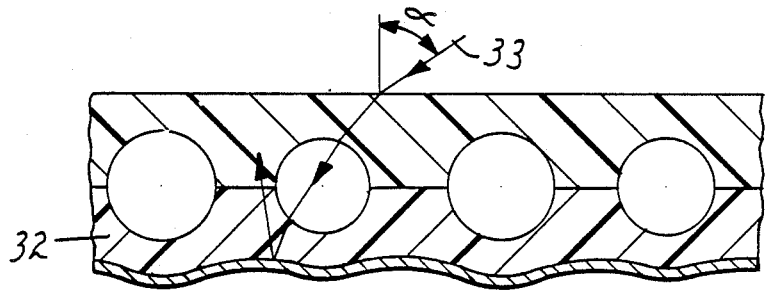
FIG. 4 is a sectional view through a representative prior art retroreflective sheeting.

The excellent angularity represented by the measurements of retroreflectivity reported in the previous paragraph contrasts sharply with the angularity exhibited by conventional commercial retroreflective sheetings, which have half-brightness angles of about 30° to 45° and become essentially non-reflective at incidence angles of about 65°. FIGS. 3 and 4 illustrate a basis that is understood to at least partially explain the measured superiority in angularity. As shown in FIG. 3, a light ray 31, which is incident on the sheeting at a high incidence angle alpha ($\alpha$), is transmitted through a microsphere 27 and spacing layer 19c into engagement with the specularly reflective layer 28, which penetrates deeply between the microspheres and conforms well to the shape of the microspheres behind which it is disposed. The light ray 31 is reflected by the specularly reflective layer 28 back toward the source of the light. By contrast, in conventional retroreflective sheeting, such as shown in FIG. 4, the spacing layer 32 is not conformed as fully around the microsphere, and the specularly reflective layer does not conform as concentrically around the microspheres, as in sheeting of the invention. The result is that a light ray 33, which strikes the prior art sheeting at the incidence angle alpha ($\alpha$) is not reflected by the specularly reflective layer back towards the source of the light, but instead is scattered within the sheeting or to some point outside the sheeting.

It may be noted that measurements of angularity should be measured on sheeting, or at a point on sheeting, where the reflected light is white and does not have a significant blue or yellow shade to it. Reflection from a retroreflective sheeting can be adversely or beneficially affected if the spacing layer is thicker or thinner than optimum, which is manifested by a blue or yellow shade to the reflected light. Most accurate results are obtained when the reflected light is white.

When stretched ten times to 125 percent of its original dimensions, with a ten-second relaxation between stretches, and then measured as to reflective brightness five minutes after stretching was completed, sheeting of this example retained 91 percent of its original reflective brightness.

For comparison, a vapor-coated specularly reflective aluminum layer was applied to a film of the above-described 2.6-index polyurethane, which except for being flat was just like that used as the spacing layer in sheeting of the invention. Samples of the resultant product were stretched ten times to 125 percent of their original dimensions and relaxed. Samples that had not been subjected to stretching and samples that had been subjected to such stretching were adhered to a flat aluminum plate and their specular reflectivity was measured in a Gardner Laboratories goniophotometer. Light was directed at the samples at an angle of 45°. The unstretched samples reflected an average of 67.8 percent of the light directed at them, while the stretched samples reflected only an average of 6.5 percent of the light directed at them.

For lamination processes as described in the examples, the polymeric materials should generally have a soft stage, as typified by the thermosoftening of partially amorphous or semicrystalline thermoplastic polymers, during which microspheres can be embedded in the films and the films laminated together. The amorphous character of the polymers is indicated by the fact that, rather than having a sharp melting point and large changes in melt viscosity as the temperature rises through the melting point, they melt or soften over a rather broad temperature range, and have only moderate or gradual changes in melt viscosity as the temperature rises through the melting range.

Figure 6:
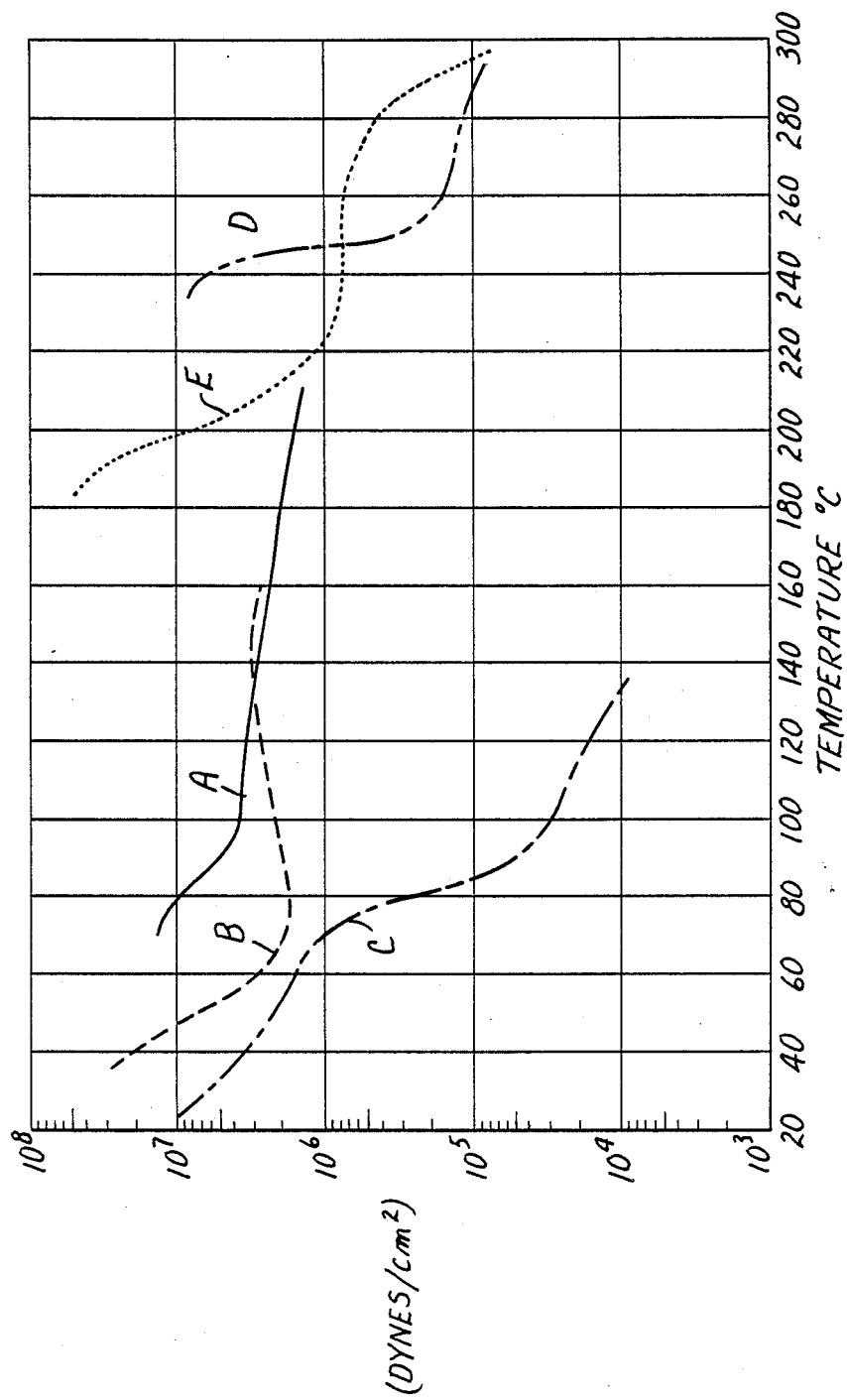
FIG. 6 is a set of graphs of loss modulus in dynes per square centimeter versus temperature in degrees centigrade for a variety of polymeric materials showing a property useful in achieving retroreflective sheeting of the invention.

This characteristic is illustrated in FIG. 6, where the loss modulus of representative polymeric materials is plotted versus temperature. The loss modulus was measured on a Rheometrics Mechanical Spectrometer where a 25-millimeter-diameter disk-shaped specimen of the material about 2 millimeters thick is mounted between a torque transducer on one side and a rotary driving or oscillating mechanism on the other side. The specimen is then subjected to an initial strain of 1-2 percent at a frequency of 10 Hertz at increasing temperature. The magnitude of rotation measured by the torque transducer which is out of phase with the driving mechanism is a measure of the viscosity of the material being tested and is reported in dynes/square centimeter on the ordinate of the graph. Curve B in FIG. 6 shows the loss modulus measured for the material of 10a in the above example (i.e., Q-thane PN03-93E). Curves A, C, D and E show the loss modulus measured, respectively, an ionically crosslinked polymer of ethylene and methacrylic acid, for ethylene vinyl acetate, cellulose acetate, and polyethylene terephthalate.

Best results in practice of this invention are obtained with materials having properties as represented in Curves A and B where there is a plateau or gradual change in viscosity over a longer temperature interval, such as 50° or 75° C. or more, in the softening range of the material. For example, upon reaching a loss modulus of about $10^6$ dynes per square centimeter, subsequent heating of the material of Curves A and B through such a temperature interval causes the loss modulus to change by less than an order of magnitude. Such a broad softening range and moderate or gradual change in melt viscosity eases processing, and allows a controlled introduction of microspheres to desired depths in the top film. Because of the broad softening range, some pressure is required to force the microspheres into the film, whereby the unembedded edges of the microspheres tend to be aligned at a common level, i.e., at the surface of a tool, such as a pressure roller, that engages the microspheres and applies the pressure. A broad softening range also allows a controlled shaping of the spacing film in a substantially constant thickness over the protruding or unembedded edges of the microspheres.

The polymeric material of the cushioning web should soften to a lower viscosity, i.e., should have a lower loss modulus, than the second polymeric layer during the lamination operation. For example, the polyethylene as used in the cushioning web of the above example exhibits a loss modulus at the lamination temperature of 320° F. (about 160° C.) of $2.6 \times 10^5$ dynes per square centimeter.

In completed sheeting of the invention, the polymeric films should not appreciably soften at temperatures lower than about 200° F. (100° C.), to maintain needed dimensional stability for the product during expected conditions of use. However, when polyester (i.e., polyethylene terephthalate) carrier webs are used in manufacture of sheeting of the invention, the polymeric materials should soften at temperatures less than about 400° F. (200° C.), at which polyester loses its dimensional stability.

The materials of the top and spacing films or layers should be compatible with one another and adapted to form a good bond together, and/or to the microspheres. The needed bond adhesion can be tested by laminating films of the materials together, or to a plate of the material from which the microspheres are made. Preferably the adhesion between the components is greater than the tensile strength of the materials.

Also, the material of the spacing film preferably can be coated with metal in a vacuum deposition process. For example, the polymer should not give off molecules in a vacuum at a rate that impedes deposition of metal so as to form a smooth adhered metal film.

Aliphatic urethanes are particularly useful elastomeric materials for use in the invention because of their outdoor stability. (Weathering stabilizers are generally included in the polymeric films, such as ultraviolet light absorbers, antioxidants, and materials that scavenge or inhibit the action of chemical radicals within the films.) Thermoplastic versions of such polyurethanes are adapted to the extrusion/lamination procedures described above. Also, these resins are tough and impact- and abrasion-resistant, and have proved to be useful in pavement markings of long-lasting retroreflectivity.

Other elastomeric materials that can be used in sheeting of the invention are aromatic polyurethanes, if yellowing on outdoor exposure is acceptable, fluoroelastomers, and polyester elastomers. "Elastomer" and "elastomeric" are used herein as defined by ASTM Special Technical Bulletin No. 184, which reads "A substance that can be stretched at room temperature to at least twice its original length and, after having been stretched and the stress removed, returns with force to approximately its original length in a short time." Upon return to its original dimensions, the original relationship of the microsphere to the specularly reflective layer is attained. While retroreflectivity is reduced or lost during stretching, i.e., because of a thinning of the layer, it returns upon relaxation of the sheeting.

It is preferred to apply a specularly reflective layer to the spacing film or layer after the film has been laminated into the sheeting product and conformed to the microspheres. The specularly reflective layer can also be applied to the spacing film prior to the lamination step, but in that event tends to crack during the lamination and conformation step, whereupon reflective brightness is reduced. Also, the specularly reflective layer is somewhat stiff and can reduce conformation of the spacing film to the microspheres and cause it to wrinkle rather than smoothly conform.

Various other layers can be included in sheeting of the invention in addition to those discussed. For example, one or more layers may be added to the top film to improve weathering resistance, or to provide added hardness, or to improve cleanability.

Adhesive or other layers are generally applied over the specularly reflective layer to complete the sheeting. Such layers protect the specularly reflective layer and also usually serve a functional purpose such as adhering the sheeting to a substrate. Conventional pressure-sensitive adhesives such as acrylate-based adhesives, or heat- or solvent-activated adhesives are typically used, and may be applied by conventional procedures, e.g., by laminating a preformed layer of adhesive on a carrier web or release liner to the specularly reflective layer.

The index of refraction and average diameter of the microspheres and the index of refraction of the material of the top layer and spacing layer dictate the thickness of the spacing film. The index is generally in the range of 2.0 to 2.5, and more typically about 2.2 to 2.3, in which case the thickness of the spacing film behind the microspheres should be about one-quarter of the average microsphere diameter. The microspheres can range from at least 40 to 120 micrometers in average diameter, but preferably they are between about 50 and 90 micrometers in average diameter. The microspheres can be treated, e.g., with an adhesion-promoting agent such as an aminosilane, to improve the bond of the microspheres to the polymeric films. Glass microspheres are typically used and have the noted non-stretchable nature which helps provide a stable surface for the specularly reflective layer; ceramic microspheres such as made by sol/gel techniques can also be used.

The microspheres vary statistically in size, which is of value especially in laminated versions of sheeting of the invention because it allows greater latitude in the thickness that the spacing film or layer must exhibit in the completed sheeting. Some microspheres within a broad range of microsphere diameters, i.e., a range of diameters equal to about 50 percent or more of the average diameter of the microspheres, will be in appropriate size relationship with the spacing film, even if the spacing film varies from its intended thickness because of imprecision during extrusion or lamination. With a broad variation in microsphere diameters, it is especially helpful for the extreme edges of the microspheres protruding from the top film to be in alignment, because the film can then more easily contact all sizes of beads, small or large, and can be more easily pressed around all these sizes. For brighter retroreflection, which is desirable in pavement markings where small areas of retroreflective sheeting are typically used, more narrowly classified microspheres may be used, with some sacrifice in angularity and retroreflective uniformity.

The best angularity in products of the invention has so far been achieved when the microspheres are present at lower than maximum density, e.g., so as to cover less than about 75 percent of the area of the polymeric layer into which the microspheres are embedded, and preferably about 65 percent or less of the area. Such a less-than-maximum density, and the consequent greater spacing between microspheres, allows the spacing film or layer to be pressed more deeply between the microspheres and to follow in a substantially uniform thickness a greater portion of the surface of the microspheres. As previously discussed, better adhesion between layers can also be achieved in this way. However, greater retroreflective brightness is achieved by use of microspheres at greater density.

For uses of sheeting of the invention on pavement markings, the microspheres in laminated versions of sheeting of the invention are preferably embedded into the cover layer to at least one-third of their average diameter, and more preferably at least forty percent of their average diameter, but less than one-half their average diameter. Such depths allow more full conformance of the laminated spacing film around the microspheres and more full contact to the cover film, to thereby improve layer-to-layer adhesion.

Figure 5:
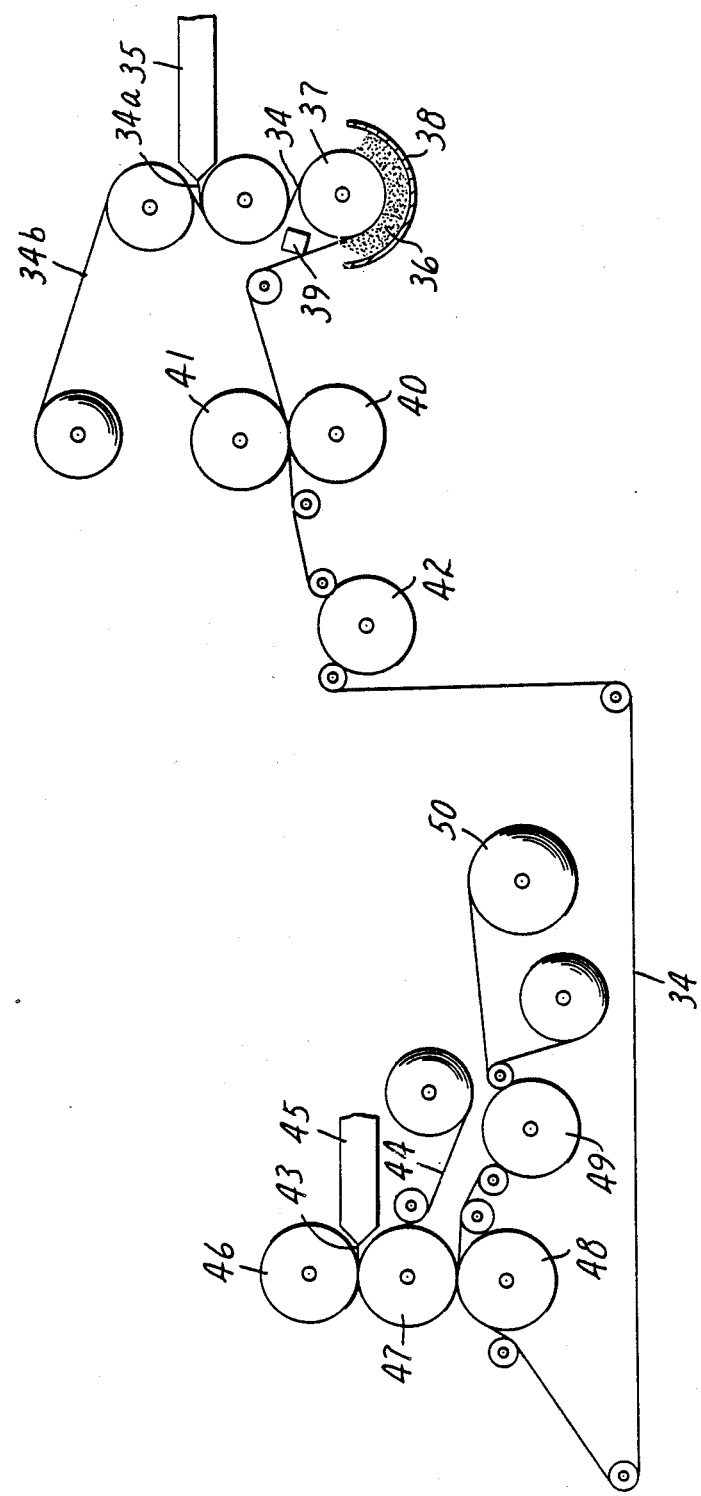

In a preferred practice of the invention the lamination of the microsphere-covered film and spacing film is performed in line, i.e., as part of a continuous process. Extrusion of the microsphere-carrying and spacing films and the operation of embedding microspheres in the film also can be part of the process. Apparatus for performing such a continuous process is schematically pictured in FIG. 5. In this apparatus a film 34a is extruded through an extruder 35 onto a carrier film 34b. Microspheres 36 are embedded in the resulting composite film 34 using a heated roll 37, microsphere-supporting pan 38, vibrator 39, heated and nip rolls 40 and 41 and cold roller 42 in the same manner as described in Example 1 above. A spacing layer or film 43 is extruded onto a cushioning web 44 in the general manner described in Example 1, using nip rollers 46 and 47; and the spacing film is laminated to the microsphere-carrying film 34 using a heated roller 48, nip roller 47, and a cooling roller 49. The cushioning web is stripped away and wound in roll 50.

The use of one continuous process for extruding and laminating allows a unique opportunity to improve the process and save costs. This improvement is accomplished by measuring or viewing the retroreflectivity of the web product after lamination of the microsphere-covered film and spacing film, e.g., by beaming a light at the laminated product and measuring the retroreflectivity, generally at an incidence angle of about 5°. To the extent that reflectivity is lower than standard the operations in the process can be directly altered, e.g., by changing the thickness of the extruded spacing film to raise reflectivity to the standard level. The result is to minimize the amount of reflective sheeting manufactured with less than standard reflectivity.

Sheeting of the invention can also be prepared by non-lamination processes. For example, in some embodiments of the invention, the spacing layer is coated from solution over a layer of microspheres, typically while the microspheres are supported in a binder layer or cover layer. Also, the cover layer can be coated from solution, and microspheres deposited in the cover layer before it has solidified. The procedure described in U.S. Pat. No. 3,551,025 may be used. Also the construction in that patent, using a binder layer (typically called a cover layer by the nomenclature used herein) in which the microspheres are held as well as a top layer over the binder layer can be used, except that a spacing layer is also used.

The films incorporated in sheeting of the invention may be colored, e.g., through inclusion of a transparent pigment or dye, whereby the sheeting is given a desired color. Also, images may be printed on one or more of the films. When the images are printed on surfaces that are embedded within the sheeting, the images become embedded in the sheeting and are thereby improved in durability. Special reflective effects can be obtained depending on where the images are embedded and on the dimensions of lines in the image; e.g, images printed on the spacing film may become visible only during retroreflective viewing, especially if formed with narrow lines (as taught, for example, by U.S. Pat. No. 3,154,872).

As previously mentioned, sheeting of the invention is especially adapted for use on pavement markings, in which the sheeting is typically adhered to a base support that is adapted to be adhered to a paved surface. Useful pavement markings may take the form, for example, of tapes of extended length, or may comprise discrete articles which may be spaced along the length of a roadway. See U.S. Pat. No. 3,785,719, which teaches a roadway delineator having an elastomeric reflective portion (using sheeting as described in the previously mentioned U.S. Pat. No. 3,449,201), and U.S. Pat. No. 4,035,059, which teaches a low-profile raised retroreflective pavement marker that also uses such a sheeting. Both patents, which are incorporated herein by reference, teach raised pavement markers, which extend above a paved surface so as to be visible and reflective even when the pavement is wet. In raised markers, retroreflective sheeting is typically adhered to a portion of a base support that is not parallel to the paved surface, but which preferably makes an angle of at least 20° and more preferably at least 45° to the paved surface. Sheeting of the invention is especially adapted for use on deformable pavement markers in which the base support deforms when struck by a vehicle tire, e.g., a flap on the base support bends, or the support compresses to less than its original volume.

What is claimed is:

1. Elastomeric, embedded-lens retroreflective sheeting capable of being repeatedly stretched and relaxed while maintaining useful retroreflective properties comprising
   (a) a monolayer of transparent non-stretchable microspheres;
   (b) a sheet in which the microspheres are embedded comprising (i) a transparent polymeric spacing layer underlying the back surface of the microspheres and having a back surface that is spaced from the back surface of the microspheres, and (ii) a transparent polymeric cover layer covering the front surface of the microspheres; and (c) a specularly reflective layer coated on said back surface of the spacing layer;

said transparent polymeric layers comprising elastomeric materials which may be repeatedly stretched and upon. release of the stretching tension rapidly return to substantially their original dimensions.

2. Retroreflective sheeting of claim 1 in which the spacing layer comprises a clear thermoplastic elastomeric aliphatic polyurethane.

3. Retroreflective sheeting of claim 2 in which the cover layer comprises a clear thermoplastic elastomeric aliphatic polyurethane.

4. Retroreflective sheeting of claim 1 in which the monolayer of transparent microspheres is embedded in the cover layer, and the transparent polymeric spacing layer is a preformed layer laminated in substantially full contact to the microsphere-covered surface of the cover layer, whereby it is in contact with, and follows the curved surfaces of, the microspheres protruding from the first layer between the microspheres.

5. Retroreflective sheeting of claim 4 in which the microspheres are embedded in the cover layer to on the average less than half their diameter but more than one-third their diameter.

6. Retroreflective sheeting of claim 4 in which the microspheres cover less than 75 percent of the area of the cover layer.

7. Retroreflective sheeting of claim 4 in which the microspheres vary in diameter through a range equal to at least about 50 percent of the average diameter of the microspheres.

8. Retroreflective sheeting of claim 4 in which at least one of the cover and spacing layers comprises a thermoplastic polymer that exhibits a less-than-order-of-magnitude reduction in loss modulus measured in dynes per square centimeter over a 50° C.-temperature interval within the softening range of the polymer.

9. Retroreflective sheeting of claim 1 which further includes a polymeric layer covering said specularly reflective layer.

10. Retroreflective sheeting of claim 9 in which said polymeric layer comprises an adhesive.

11. A pavement marking product in which retroreflective sheeting as described in claim 1 is adhered to a base support adapted to be adhered to a paved surface.

12. A pavement marking product of claim 11 in which the base support comprises a deformable raised structure and the retroreflective sheeting is adhered to a surface of the base support that is not parallel to the paved surface.

13. Retroreflective sheeting of claim 1 in which the microspheres cover less than about 75 percent of the area of the cover layer.

14. Elastomeric embedded-lens retroreflective sheeting comprising first and second transparent elastomeric layers, at least one of said layers being an extruded layer which, in at least one stage during manufacture of the sheeting, is at least partially amorphous and capable of thermosoftening; a monolayer of transparent nonstretchable microspheres embedded in the first layer to on the average between about one-third and one-half of their diameter, with the extreme edges of the portions of the microspheres protruding from the first layer being located substantially in a common plane; and with the second polymeric layer being laminated in substantially full contact to the microsphere-covered surface of the first layer whereby it is in direct contact with, and follows the curved surfaces of, the portions of the microspheres protruding from the first layer, and also is in direct contact with the portions of the first layer between the microspheres; a specularly reflective layer vapor-coated on the exposed configured surface of the second layer; and a polymeric layer covering said vapor-coated layer; said retroreflective sheeting exhibiting a half-brightness angle of at least 50° on at least one axis of the sheeting; said transparent polymeric layers comprising elastomeric materials which may be repeatedly stretched and upon release of the stretching tension rapidly return to substantially their original dimensions whereupon the sheeting exhibits retroreflectivity and angularity of retroreflection nearly like that before stretching.

15. Retroreflective sheeting of claim 14 in which the microspheres cover less than 75 percent of the area of the first polymeric layer.

16. Retroreflective sheeting of claim 14 in which the microspheres vary in diameter through a range equal to at least about 50 percent of the average diameter of the microspheres.

17. Retroreflective sheeting of claim 14 in which at least one of the first and second polymeric layers comprises a thermoplastic polymer that exhibits a less-than-order-of-magnitude reduction in loss modulus measured in dynes per square centimeter over a 50° C.-temperature interval within the softening range of the polymer.

18. Retroreflective sheeting of claim 14 in which the second polymeric layer comprises a clear thermoplastic aliphatic polyurethane.

19. Retroreflective sheeting of claim 18 in which the first polymeric layer comprises a clear thermoplastic aliphatic polyurethane.

20. A pavement marking product in which retroreflective sheeting as described in claim 14 is adhered to a base support adapted to be adhered to a paved surface.

21. A pavement marking product of claim 20 in which the base support comprises a deformable raised structure and the retroreflective sheeting is adhered to a surface of the base support that is not parallel to the paved surface.

* * * * *

UNITED STATES PATENT AND TRADEMARK OFFICE
CERTIFICATE OF CORRECTION

PATENT NO. : 4,950,525

DATED : August 21, 1990

INVENTOR(S) : Terry R. Bailey

It is certified that error appears in the above-identified patent and that said Letters Patent is hereby corrected as shown below:

Col. 1, line 61, after "layer" change the comma to a -- . --; and change "very" to -- Very --.

Col. 1, line 67, change "laYer" to -- layer --.

Col. 11, line 12, delete the period after "upon".

Signed and Sealed this

Twenty-ninth Day of October, 1991

Attest:

HARRY F. MANBECK, JR.

Attesting Officer

Commissioner of Patents and Trademarks